United States Patent
Salmon-Legagneur et al.

(10) Patent No.: US 9,442,704 B2
(45) Date of Patent: Sep. 13, 2016

(54) CONTROL FLOW GRAPH FLATTENING DEVICE AND METHOD

(71) Applicant: THOMSON LICENSING, Issy les Moulineaux (FR)

(72) Inventors: Charles Salmon-Legagneur, Rennes (FR); Antoine Monsifrot, Rennes (FR)

(73) Assignee: THOMSON LICENSING, Issy-les-Moulineaux (FR)

( * ) Notice: Subject to any disclaimer, the term of this patent is extended or adjusted under 35 U.S.C. 154(b) by 0 days.

(21) Appl. No.: 14/922,155

(22) Filed: Oct. 24, 2015

(65) Prior Publication Data

US 2016/0117153 A1    Apr. 28, 2016

(30) Foreign Application Priority Data

Oct. 24, 2014   (EP) .................................. 14306695
Feb. 16, 2015   (EP) .................................. 15305231

(51) Int. Cl.
G06F 9/45     (2006.01)
G06F 21/14    (2013.01)
G06F 9/30     (2006.01)

(52) U.S. Cl.
CPC .............. *G06F 8/433* (2013.01); *G06F 8/443* (2013.01); *G06F 21/14* (2013.01); *G06F 9/30058* (2013.01)

(58) Field of Classification Search
CPC ...................................................... G06F 9/45
USPC ........ 717/131–133, 144, 155, 156, 157, 159
See application file for complete search history.

(56) References Cited

U.S. PATENT DOCUMENTS

| | | | |
|---|---|---|---|
| 5,184,213 A * | 2/1993 | Ishida ...................... | H04N 1/52 358/3.03 |
| 6,463,582 B1 * | 10/2002 | Lethin ................. | G06F 9/45504 717/138 |
| 6,779,114 B1 | 8/2004 | Chow et al. | |
| 6,842,862 B2 | 1/2005 | Chow et al. | |
| 7,350,085 B2 | 3/2008 | Johnson et al. | |
| 7,797,691 B2 | 9/2010 | Cockx et al. | |
| 7,886,280 B2 | 2/2011 | Zawawy | |
| 7,949,511 B2 | 5/2011 | Ganai | |
| 8,756,435 B2 | 6/2014 | Lerouge et al. | |
| 2006/0242466 A1 * | 10/2006 | Tillmann ............ | G06F 11/3684 714/38.1 |

(Continued)

FOREIGN PATENT DOCUMENTS

WO    WO2010020603    2/2010

OTHER PUBLICATIONS

Cappaert( "A General Model for Hiding Control Flow"), Oct. 4, 2010.*

(Continued)

*Primary Examiner* — Chat Do
*Assistant Examiner* — Jae Jeon
(74) *Attorney, Agent, or Firm* — Brain J. Dorini; Patricia A. Verlangieri (57) ABSTRACT

Control Flow Graph flattening of a function of software code including a plurality of basic blocks having an address and at least one instruction is described. A processor uses a transition function to obtain an address in a jump table of at least one diffusion function coefficient of a subsequent block of the plurality of basic blocks. Thereafter, the processor generates and inserts branch functions, assigning a value to the label of each of the plurality of basic blocks and then obtains coefficients for each of the plurality of basic blocks.

8 Claims, 4 Drawing Sheets

(56) References Cited

U.S. PATENT DOCUMENTS

2007/0089097 A1* 4/2007 Hu ..................... G06F 8/443
 717/132
2013/0232323 A1 9/2013 Lerouge et al.

OTHER PUBLICATIONS

Balachandran etal: "Software Code Obfuscation by Hiding Control Flow Information in Stack"; Information Forensics and Security (WIFS), 2011 IEEE International Workshop on, Nov. 29, 2011-Dec. 2, 2011, pp. 1-6.
Barak et al: "On the Impossibility of Obfuscating Programs"; In Advances in Cryptology CRYPTO 2001, Aug. 16, 2001, pp. 1-18.
Cappaert: "Code Obfuscation Techniques for Software Protection"; PhD Thesis; Katholieke Universiteit Leuven, Apr. 2012, http://www. cosic. esat. kuleuven.be/publications/thesis-199. pdf; pp. 1-132.
Cappaert etal: "A General Model for Hiding Control Flow"; Proceedings of the tenth annual ACM workshop on Digital rights management, 2010, pp. 35-42.
Chen et al: "Confuse: LLVM-based Code Obfuscation"; No date specified; pp. 1-14.
Chow et al: "An approach to the obfuscation of control-flow of sequential computer programs"; In Information Security, 2001, pp. 144-155. Springer.
Collberg etal: "A Taxonomy of obfuscating transformations"; Technical report, Department of Computer Science, The University of Auckland, New Zealand, 1997; pp. 1-36.
Courousse etal: "COGITO: code polymorphism to secure devices"; In SECRYPT 2014—Proceedings of the 11th International Conference on Security and Cryptography, Aug. 28-30, 2014, pp. 451-456.
Ferraris: "Call-graph flattening transform for LLVM 2.8"; https://github.com/CAFxX/cgf Authored on Aug 2, 2011; pp. 1-2.
Gueguen et al: Poster: Design and Automatic Evaluation of Control Flow Obfuscators in a Dynamic Attack Context:; 2014; pp. 1-2.
Korobeynikov: "Improving Switch Lowering for the LLVM Compiler System"; In Proceedings of the Spring/Summer Young Researchers O Colloquium on Software Engineering, May 2007, No. 1; pp. 1-5.
Laszlo etal: "Obfuscating C plus plus programs via control flow flattening"; Annales Universitatis Scientarum Budapestinensis de Rolando Etovos Nominatae, Sectio Computatorica, 2009, 3;0; pp. 3-19.
Madou etal: "Loco: An interactive code (de) obfuscation tool"; In Proceedings of the 2006 ACM SIGPLAN symposium on Partial evaluation and semantics-based program manipulation. ACM Jan. 10, 2006, pp. 140-144.
Ramalingam: "The Undecidability of Aliasing"; ACM Trans. Program. Lang. Syst. Sep. 1994., 16(5):pp. 1467-1471.
Sayle: "A superoptimizer analysis of multiway branch code generation"; In GCC Developers O Summit, 2008, vol. 103; pp. 1-16.
Udupa et al: "Deobfuscation: Reverse engineering obfuscated code";In Reverse Engineering, 12th Working Conference on, Nov. 7-11, 2005, pp. 1-10. IEEE.
Venderbeken: "Mise a plat de graphes de flot de controle et execution symbolique"; SSTIC, 2013; pp. 1-18.
Wang: "A Security Architecture for Survivability Mechanisms"; PhD thesis, University of Virginia, 2001; pp. 1-209.
Wang et al: "Protection of Software-based Survivability Mechanisms in Dependable Systems and Networks";2001. DSN 2001. International Conference on, pp. 193-202. IEEE, 2001.
Wang etal: "Software tamper resistance: Obstructing static analysis of programs"; Technical Report CS-2000-12, University of Virginia, Dec. 2000; pp. 1-18.
Aucsmith: "Tamper resistant software: An implementation"; Information Hiding, vol. 1174 of Lecture Notes in Computer Science, pp. 317-333. Springer, 1996.
Cytron et al.:Efficiently computing static single assignment form and the control dependence graph; ACM Transactions on Programming Languages and Systems (TOPLAS), 13(4): pp. 451-490, 1991.
Ge et al: "Control flow based obfuscation"; Proceedings of the 5th ACM workshop on Digital rights management, pp. 83-92. ACM.
Junod et al: "Obfuscator reloaded"; Application security forum 2012—slides 1-47; Nov. 7, 2012.
Junod: LLVM and code obfuscation;Technical report, Universite Catholique de Louvain, Belgium; 2013; pp. 1-67.
Lattner et al: "The LLVM compiler framework and infrastructure tutorial"; Languages and Compilers for High Performance Computing, pp. 15-16. Springer, 2005.
Omar et al: "Arbitrary control-flow embedding into multiple threads for obfuscation: a preliminary complexity and performance analysis"; Proceedings of the 2nd international workshop on Security in cloud computing, pp. 51-58. Jun. 3, 2014.
Souchet: "Obfuscation of steel, meet my kryptonite"; Jul. 6, 2013; pp. 1-24.
Wegman et al: "Constant Propagation With Conditional Branches.", ACM Transactions on Programming Languagesand Systems, vol. 13, No. 2, 1991, pp. 181-210.
Search Report Dated August 5, 2015.

* cited by examiner

```
int f(int i, int j)
{
    int a = 0;
    if (i < j) {
        a = j;
    }
    else
        do {
            a *= i--;
        } while (i > 0);

return a;
}
```

CONTROL FLOW GRAPH FLATTENING DEVICE AND METHOD

This application claims the benefit, under 35 U.S.C. §119 of European Patent Application No. 14306695.9, filed Oct. 24, 2014 and European Patent Application No. 15305231.1, filed Feb. 16, 2015.

TECHNICAL FIELD

The present principles relate generally to computer systems and in particular to control flow graph (CFG) flattening.

BACKGROUND

This section is intended to introduce the reader to various aspects of art, which may be related to various aspects of the present principles that are described and/or claimed below. This discussion is believed to be helpful in providing the reader with background information to facilitate a better understanding of the various aspects of the present principles. Accordingly, it should be understood that these statements are to be read in this light, and not as admissions of prior art.

Control flow graph (CFG) flattening is a software obfuscation technique used to make reverse engineering of a function difficult. The initial CFG of a function, made of basic blocks (BB) and jumps between them, is transformed to a functionally equivalent flattened graph. In the flattened graph, a central basic block, the dispatcher (D), leads to all other BBs, which all call back to the dispatcher. Wang first described this technique in a PhD thesis "A Security Architecture for Survivable Systems", Department of Computer Science, University of Virginia, and in C. Wang, J. Davidson, J. Hill & J. Knight, "Protection of software-based survivability mechanisms," In *Dependable Systems and Networks* 2001, *DSN* 2001, *International Conference on. IEEE*.

Figure 1:
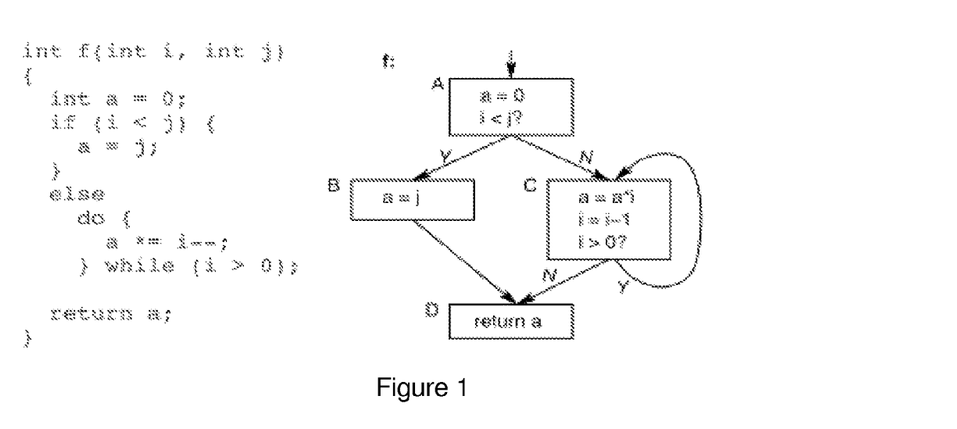
FIG. 1 illustrates an exemplary function and its corresponding CFG.
Figure 2:
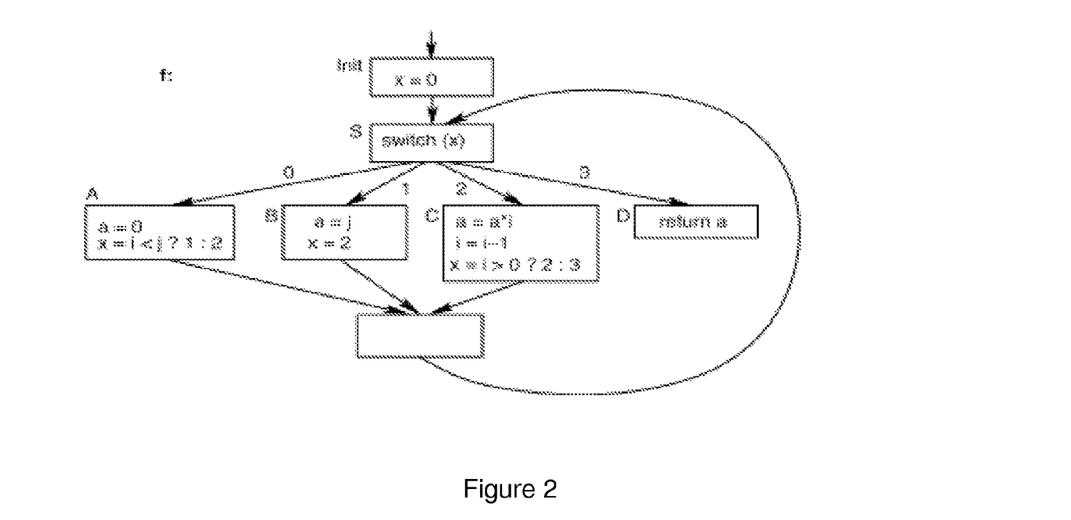
FIG. 2 illustrates a flattened CFG corresponding to the CFG in FIG. 1.

FIG. 1 illustrates an exemplary function f and its corresponding CFG comprising four BBs, A-D. FIG. 2 illustrates a flattened CFG corresponding to the CFG in FIG. 1. It can be seen that the dispatcher executes a switch function S between the execution of BBs.

The control flow during execution is dependent on a dispatcher variable X. This variable is instantiated locally to a label $X_i$ in each basic block $BB_i$. At runtime, each basic block $BB_i$ is assigned a new label $X_{i+1}$ thereby indicating which next basic block to be executed next. A switch block then uses the dispatcher variable X to jump indirectly, via a jump table, to the intended successive basic block.

Every basic block $BB_i$ embeds instructions to compute label $X_{i+1}$ from label $X_i$. Caeppaert calls this a branch function [see J. Cappaert, *A General Model for Hiding Control Flow*, Proceedings of the tenth annual ACM workshop on DRM, ACM 2010]. In this description the branch function is denoted $B_i(X_i)$.

As an example, in basic block A, the statement {x=i<j? 1:2} can be expressed generally as the result of a branch function $B_A(\ )$: $B_A(X_A)$=BooleanFunction(inputs)*a+b. More particularly, $B_A(X_i)$=(i<j?)*1+(i>=j?)*2. (i<j?) is a Boolean function that returns 1 or 0, so $B_A(\ )$ returns 1 or 2 depending on the inputs, i and j. A branch function can be generalized to any conditional statement having more than two term conditions.

The dispatcher uses another function, the transition function F( ). In FIG. 2, this function is responsible for converting the label $X_i$, to an address $PA_i$ of the next BB to execute. When flattening a CFG at source code level (e.g. for a program in C language), the transition function F( ) may be implicit. For example, the switch case in the dispatcher is converted to a sequence of instructions by the compiler. However, when flattening the CFG for a low level assembly language (e.g. X86), the transition function normally has to be written expressly.

Figure 3:
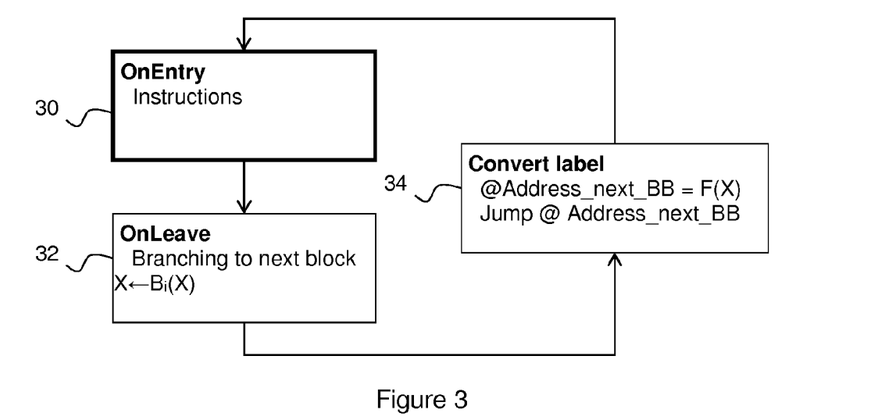
FIG. 3 illustrates a generic sequence diagram for a flattened CFG.

FIG. 3 illustrates a generic sequence diagram for a flattened CFG. A basic block $BB_i$ comprises two parts: a first part 30 executed upon entry to the BB and a second part 32 that is executed before leaving the BB. The second part 32 calculates the next label $X_{i+1}$ that is used by a dispatcher 34 to compute the address of the next BB and then jumps to this address. The bold border of the first part 30 indicates that this part is part of the original, non-flattened, CFG.

Basic implementations of flattened CFGs are vulnerable to static analysis attacks. By analysing each basic block and the constants used by the branch function B( ), an attacker is able to gain knowledge of dependencies between basic blocks, and then rebuild the original CFG. For example, in block 1 in FIG. 2, the conditional statement (x=i<j? 1:2) permits to deduce a relation between basic block A and basic blocks B and C.

A more generalized technique proposed by Cappaert in the previously mentioned paper consists in expressing the label $X_{i+1}$ relatively to the label $X_i$: $B_i(X_{i+1})=X_i+a_i$*BooleanFunction(inputs)$+b_i$. The meaning of $(a_i,b_i)$ has slightly evolved, it no longer directly expresses a label value, but relative differences between labels. However, Cappaert observes that this representation is still vulnerable to local analysis. The differences between labels restrict the set of possibilities for $X_i$, and thus leak information to the attacker, making brute force attacks feasible.

More specifically, the attacker has access to the code of the transition function, and thus knows the correspondence between labels $X_i$ and addresses $PA_i$ of the basic blocks. To deduce the label of a basic block is straightforward: the attacker just has to compare the current address of the basic block and the information in the dispatcher. So for a given $BB_i$, the attacker can guess what the current label $X_i$ is, and then propagate the constant values $(a_i,b_i)$ backward and forward to deduce the predecessor and the successor of each basic block.

It can thus be seen that the existence of a logical inference chain between embedded constants in the branch function, the logical labels, and the address of the basic block causes a problem. Existing protections find a way of breaking this chain of logical inferences.

A first solution was proposed by Wang in the previously mentioned PhD thesis. The solution focuses on the obfuscation of the embedded constants. These are not changed, but simply expressed in term of formulae, using a global array. For this purpose Wang defines a global array g_array, containing fakes values and valid values. If, for example, g_array[10]=1 and g_array[20]=1, then the constant $C_i$=2 can be expressed by mathematical operation on elements of the array: $C_i$=(g_array[10]+g_array[20]) mod N. However, the solution is hardly more robust as the array is static and constant. By obtaining access to the array through reverse engineering, an attacker can resolve the different formulae.

To counter this attack, Wang further proposes to periodically reshuffle and redistribute the content of g_array using a redistribution function that is invoked outside of the flattened function. Ideally, this solution could be secure if the redistribution is not done externally, but internally in the flattened function during transition between basic blocks.

However, Wang does not give any clues on how to achieve this. Moreover, there is a further difficulty. In a graph, multiple paths can lead to the same basic block. If for example both basic blocks A and B lead to C, then the content of the array is not deterministic in C.

A second solution was proposed by Jung Ge et al. [See Jung Ge, Soma Chaudhuri, Akhilesh Tyagi: *Control Flow Based Obfuscation*, in Proceedings of DRM 05, the $5^{th}$ ACM Workshop on Digital Rights Management]. According to this solution called CFI-hiding scheme, based upon Aucsmith's algorithm, sets of basic blocks are shuffled, XORed together, and dynamically deciphered at execution by a monitoring process called Self-modifying scheme. At any time the only set of basic block that is in clear text is the one that is already executed. [See D. Aucsmith: *Tamper Resistant Software: An Implementation*, in R. J. Anderson, editor, Information Hiding, volume 1174 of Lecture Notes in Computer Science].

A third solution was provided by Apple in patent application US 2013/0232323 that describes a solution that obfuscates the control flow in a different way. All calls are replaced by indirect jumps using a jump table. The basic blocks are not encrypted, but the jump table is; only a portion of the jump table is in the clear at a given time.

A common drawback with self-modifying schemes like the one by Jung Ge et al. is that the program requires write permission on itself. Such protection techniques are sometimes not allowed on some application platforms, like the iOS appstore, for which these techniques are assimilated to polymorphic viruses. Thus a protected application would not pass the security verifiers in charge of verifying the safety of the application before publishing it. Another problem with self-modifying techniques is their vulnerability to replay attacks. The randomization induced by the protection can be overcome if the attacker has means to restart execution from a backup initial state.

A fourth solution was provided by Cappaert in the previously mentioned paper. The solution uses a one-way function, typically a hash function applied on label values $X_i$ when entering the dispatcher. The resulting value is then matched against a series of if . . . then clauses to determine the next address.

By static analysis of the dispatcher in depth, an attacker obtains knowledge of all the possible images of label values by the hash function and of all addresses referenced. But as the hash function is not invertible, the antecedent label values cannot be obtained with certainty. By coding the label values with enough bits (for example a 128-bit random number), the input domain of the hash function cannot be enumerated by brute force. The attacker then cannot predict which antecedent $X_i$ label values leads to a given $Z_i$ value, and, thus, the corresponding antecedent address values.

It will be appreciated that this stops logical backward inference and makes forward inference more complex. In other words, the attacker cannot statically predict the predecessor of a basic block, and the constants used in the branching function have only a meaning for logical labels, and do not express indirectly constraints to basic block addresses. Hence, differences values between labels are no longer exploitable.

Unfortunately, while this solution provides good security, it has a serious drawback in terms of performance. The drawback stems from the dispatcher. In practice, the compiler replaces the dispatcher's switch statement by a cascade of if . . . else condition statements. Given a CFG that has N basic blocks, the switch case will result in the cascade of N more conditional statements, so N more conditional basic blocks. A first consequence is that the number of total basic blocks in the CFG is multiplied by two (twice more times jump instructions). A second consequence is that each time the processor executes the dispatcher, it faces a cascade of N conditional statements, which results in the cost of potentially 2*N additional instructions. Moreover, this technique adds many comparisons and jump instructions to the execution, and also stresses the branch prediction much. For each missed branch prediction the processor started to execute instructions that then are not executed and the processor then has to 'undo' everything before continuing execution at the right address.

Indeed, when using a flattened CFG based upon switch case, execution time is proportional to the square of the number of basic blocks ($O(n^2)$). The time penalty is so great for large functions that it is difficult to envisage the solution to protect a major part of the protected binary. As a result, to keep a good execution performance, the coverage of the protection has to be limited to only some sensitive portions of the code, which naturally decreases the security. The poor performance result is a direct consequence of the selected hash function; the outputs of such functions are discontinuous values that cannot be mapped directly to an indexed table.

It will thus be appreciated that there is a need for a CFG flattening solution addresses these and other problems. The present principles can provide such a solution.

SUMMARY

In a first aspect, the principles are directed to a method for control flow graph flattening of a function of software code, the function comprising a plurality of basic blocks each having an address and at least one instruction, the method, performed by a processor of a device, comprising assigning a value to at least one diffusion function coefficient of a diffusion function of each of the plurality of basic blocks; calculating changes for labels and diffusion functions indices upon transitions between the plurality of basic blocks, the changes corresponding to modifications made by a linear first branch function and a linear second branch function; creating a dispatcher basic block comprising instructions to look up an address in a jump table and to jump to the address; creating the jump table associating the label of each basic block with the address of the basic block; creating a coefficient array comprising diffusion function coefficients; replacing a jump terminal instruction by a jump to the dispatcher basic block in each of the plurality of basic blocks; creating and inserting into each of the plurality of basic blocks the first branch function and the second branch function, the first branch function taking as input a result of a diffusion function in the present basic block and outputting the label of the subsequent basic block to execute, the second branch function taking as input a diffusion function index of the present basic block and outputting a diffusion function index of the subsequent basic block based; creating and inserting a transition function into the dispatcher basic block, the transition function obtaining the address in the jump table based on at least the label of the subsequent basic block; and creating and inserting diffusion functions in the plurality of basic blocks, a diffusion function inserted in the present basic block calculating a value based on at least one diffusion function coefficient dependant on the diffusion function index and the label of the present basic block.

Various embodiments of the first aspect comprise that:
the transition function obtains the address in the jump table based on also at least one diffusion function coefficient of the subsequent basic block;
before creating and inserting the branch functions, assigning a value to the label of each of the plurality of basic blocks;
obtaining coefficients for each of the plurality of basic blocks.

In a second aspect, the principles are directed to a device for control flow graph flattening of a function of software code, the function comprising a plurality of basic blocks each having an address and at least one instruction, the device comprising a hardware processor configured to assign a value to at least one diffusion function coefficient of a diffusion function of each of the plurality of basic blocks; calculate changes for labels and diffusion functions indices upon transitions between the plurality of basic blocks, the changes corresponding to modifications made by a linear first branch function and a linear second branch function; create a dispatcher basic block comprising instructions to look up an address in a jump table and to jump to the address; create the jump table associating a label of each basic block with the address of the basic block; create a coefficient array comprising diffusion function coefficients; replace a jump terminal instruction by a jump to the dispatcher basic block in each of the plurality of basic blocks; create and insert into each of the plurality of basic blocks the first branch function and the second branch function, the first branch function taking as input a result of a diffusion function in the present basic block and outputting the label of the subsequent basic block to execute, the second branch function taking as input a diffusion function index of the present basic block and outputting a diffusion function index of the subsequent basic block based; create and insert a transition function into the dispatcher basic block, the transition function obtaining the address in the jump table based on at least the label of the subsequent basic block; and create and insert diffusion functions in the plurality of basic blocks, a diffusion function inserted in the present basic block calculating a value based on at least one diffusion function coefficient dependant on the diffusion function index and the label of the present basic block; and an interface configured to output the function after control flow graph flattening.

Various embodiments of the second aspect comprise that the processor is further configured to:
make the transition function obtain the address in the jump table based on also at least one diffusion function coefficient of the subsequent basic block;
assign a value to the label (X) of each of the plurality of basic blocks, before creating and inserting the branch functions;
obtain coefficients for each of the plurality of basic blocks.

BRIEF DESCRIPTION OF DRAWINGS

Preferred features of the present principles will now be described, by way of non-limiting example, with reference to the accompanying drawings, in which.

DESCRIPTION OF EMBODIMENTS

In its current implementation, Wang's solution does not resist well against static analysis and leak of information. The constant coefficients used in every branch function of each BB should not be predictable by static analysis, so they should not be assigned constant values, even obfuscated from outside call sites. One aspect of the present principles is to overcome limitations of Wang's solution by providing a stronger obfuscation of coefficients.

The present principles rely on the use of a live variable X and a diffusion function D, instantiated randomly at compilation time for each BB of the code to be protected; where necessary for the sake of clarity, for $BB_i$ the variable is denoted $X_i$ and the diffusion function $D_i$. The variable and the diffusion function can be made uncorrelated and unpredictable by static analysis and are:
a current logical label $X_i$ in the range $\{1 \ldots n\}$, where n is the number of BBs of the code to protect; and
a current diffusion function $D(\ ) \in \{D_{P1}(\ ) \ldots D_{Pm}(\ )\}$ that modifies the values of the current logical label $X_i$. In practice, the diffusion function is identified using a diffusion function index $P_i$ that is updated after use in the basic blocks.

It is assumed that $X_0$ and $P_0$ are retrieved securely or passed as parameters in any suitable prior art manner; how this is done is beyond the scope of the present principles. X and P will be used without indices except when this may cause confusion, e.g. when referring to both a current value and a future value.

Figure 4:
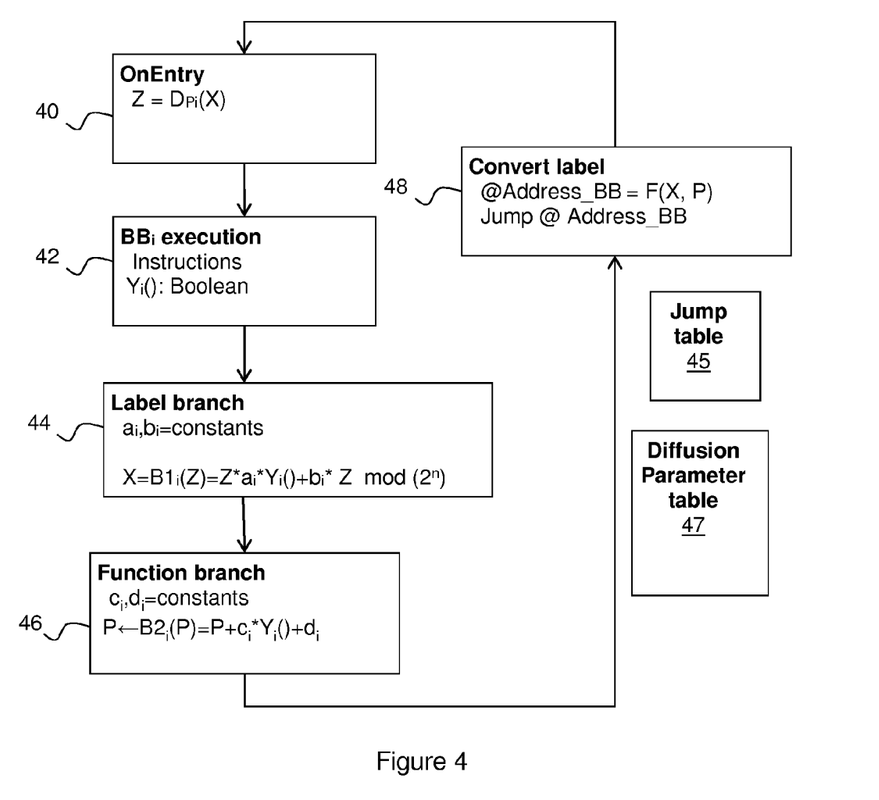
FIG. 4 illustrates a computer program with a flattened CFG.

During CFG flattening to protect a binary, a flattening tool inserts the following in the intermediate representation to obtain the flattened CFG, illustrated in FIG. 4 for one generic BB and a dispatcher:
a jump table;
a dispatcher basic block configured to determine the next basic block to execute;
a transition function $F(X): \{1 \ldots n\} \to N$, called by the dispatcher, that translates, using the jump table, the logical label X to an address PA of the BB to which execution will jump is going to jump;
a diffusion function $D_{Pi}(\ )$, to be executed when entering $BB_i$. $D_{Pi}(\ )$ outputs a local label Z used to compute a new logical label X. $D_{Pi}(\ )$ does not need to be one-way. The only preferred restriction on the choice of $D_{Pi}$ is that it ensures some diffusion property in $\{1 \ldots n\}$ and does not decrease entropy.
a first branch function $B1_i(\ )$ inlined in each $BB_i$ that computes the next logical label X (in $\{1 \ldots N\}$) depending on the local label Z, one or more local variables defined in the basic block and at least one conditional statement $Y_i(\ )$; and
a second branch function $B2_i(\ )$ inlined in each $BB_i$ that computes the next diffusion function $D_{Pi+1}$, depending on the current diffusion function $D_{Pi}$ and the conditional statement $Y_i(\ )$ or, put another way, computes the next diffusion function index $P_{i+1}$ based on the current function index $P_i$.

The first branch functions and the second branch functions are advantageously different between at least some, preferably all of the basic blocks.

As mentioned, FIG. 4 illustrates a computer program with a flattened CFG, the program comprising a dispatcher 48 and a basic block comprising an entry part 40, an instruction part 42 comprising the original instructions of the BB, a first branch function part 44 and a second branch function part 46. FIG. 4 also illustrates a jump table 45 and a diffusion parameter table 47. It will be understood that the program comprises a plurality of basic blocks, but that only one is illustrated for reasons of clarity. In addition, the modulus function has been left out of some formulae so as not to burden the description; the skilled person will know when the modulus is needed.

During execution, a jump is made from the dispatcher 48 to the entry part 40 of the BB and the local label Z is calculated using the current diffusion function $D_{Pi}$ operating on the current logical label X. Then the instruction part 42 is executed and the conditional statement $Y_i(\ )$ is evaluated, advantageously using one or more Boolean functions. Execution moves on to the first branch function part 44 preferably comprising at least one constant, in the example two constants $a_i$, $b_i$. The first branch function $B1_i$ is then evaluated taken the local label Z as input and preferably using the at least one constant and the evaluated conditional statement $Y_i(\ )$; in the example: $X \leftarrow B1_i(Z) = Z * a_i * Y_i(\ ) + b_i * Z \mod (2^n)$. Then the second branch function part 46 is executed in which the next diffusion function $D_{i+1}$ (i.e., the next diffusion function index $P_{i+1}$) is calculated using the second branch function $B2_i(\ )$ preferably using at least one constant taking as input the current diffusion function $D_i$; in the example: $P_i \leftarrow B2_i(P_i) = P_i + c_i Y_i(\ ) + d_i$, where $c_i$ and $d_i$ are constants. Although not illustrated, the second branch function part 46 finishes by a jump to the dispatcher 48.

In an advantageous embodiment (illustrated in FIG. 4), the transition function $F(\ )$ further depends on the at least a diffusion parameter of the diffusion function $D_i$ such as the current value of the diffusion function index P. The jump table is then obfuscated with the diffusion function index $P_i$ using any suitable obfuscation method such as, but not limited to, encryption of table cells with the diffusion function index $P_i$ or use of the diffusion function index $P_i$ as a seek offset in the table.

A role of the diffusion function $D(\ )$ is to ensure that any constants in the first branch function $B1_i(\ )$ are relative to the current instantiation of $D_{Pi}(\ )$. As a result, the constants can have a different meaning in each $BB_i$ and a global static analysis of all constants within the program do not reveal any information.

There are several appropriate diffusion functions that can be used, such as for example any of the following functions or any combination of them:

1. an affine function in Z or Z/nZ;
2. a permutation, a rotation or a S-BOX; and
3. a linear feedback shift register (LFSR).

The cost in performance and memory footprint is different for each function:

1. a table of affine functions parameter for all functions;
2. a list of permutation tables, rotation tables or S-BOXes; and
3. a list of polynomials in $GF(2^n)$.

An affine function is preferred as it represents a good trade-off between performance and memory footprint.

The second branch function $B2_i(\ )$ can be any suitable function from Z to Z, or Z to Z/nZ (e.g. modulo n). As there are no security constraints on it, a simple function can be used, such as the one used in the example: $P_i \leftarrow B2_i(P_i) = P_i + c_i Y_i(\ ) + d_i$.

The diffusion function $D_{Pi}(\ )$ and the branch function $B1_i(\ )$ should preferably be resistant to a comparison attack. The following functions are examples of such functions:

$$D_{Pi}(X): Z \rightarrow Z: D_{Pi}(X) = 2 * \text{coeff}_i * X + 1,$$

where the coefficient, $\text{coeff}_i$, is obtained from the diffusion parameter table 47; and $$B1_i(\ ): Z \rightarrow Z/nZ: B1_i(Z) = a_i * Z \cdot Y_i(\ ) + b_i * Z \mod 2^n$$

Assume that $BB_A$ (label $X_a$) has two successors $BB_b$ and $BB_c$, with labels $X_b$ and $X_c$. $B1_a(X_a)$ can return $X_b$ or $X_c$ depending on whether $Y_i(\ )$ returns 1 or 0. In this example, $Z_i = D_{Pi}(X_a)$, $X_b = (a_i * Z_i * 1 + b_i \cdot Z_i) \mod 2^n \Rightarrow X_b = (a_i * Z_i + b_i * Z_i) \mod 2^n$ and $X_c = (a_i * Z_i * 0 + b_i * Z_i) \mod 2^n \Rightarrow X_c = b_i * Z_i \mod 2^n$. Subtracting the equations for $X_b$ and $X_c$ gives $X_c - X_b = a_i * Z_i \mod 2^n$. Since $a_i * Z_i$ is not constant but depends on the variables $D_{Pi}$ and $X_i$, a comparison attach does not succeed.

The images $Z_i$ of the diffusion function serves as input to the first branch function $B1_i$. In other words, the codomain of $D_{Pi}(\ )$ is the input domain Din for $B1(\ )$. The codomain Dout of $B1(\ )$ regroups random label values. The choice of a diffusion function $D_{Pi}$ should then satisfy a reachability property for $B1(\ )$: for any values (x,y) from (Din,Dout), there should be a coefficient for $B1(\ )$ such that y is the image of x by $B1(\ )$. There are many such functions. Using two constants, it is always possible to satisfy the requirement. For example, if $X_{i+1} = B1_i(Z_i) = (a_i * Z_i \cdot Y_{i(\ )} + b_i * Z_i) \mod 2^n$, there must be at least one solution $(a_i, b_i)$ that satisfies the equation, whatever the values of $Z_i$ and $X_{i+1}$ are since $Z_i$ is odd.

Another way to write $B1(\ )$ is to use the Boolean function $\text{inv}Y_i(\ )$ which returns the inverse result of $Y_i(\ )$, e.g. $\text{inv}Y_i(\ ) = 0$ if $Y_i(\ ) = 1$. This makes it possible to write:

$$X \leftarrow B1_i(Z) = (a'_i * Z * Y_i(\ ) + b'_i * Z * \text{inv}Y_i(\ )) \mod 2^n$$
$$= a'_i * Z \mod 2^n \quad \text{if } Y_i(\ ) = 1,$$
$$= b'_i * Z \mod 2^n \quad \text{if } Y_i(\ ) = 0.$$

Thus, the equation is satisfied if there is an "a" such that: $a * Z \mod 2^n = X_j \ \forall Z, X_j$. This equation has a solution if Z and $2^n$ are coprime, in which case Z is a generator of $Z/2^nZ$. An easy way to insure this property is to define the diffusion function so that it returns an odd number. If Z is odd, e.g $Z = 2*b+1$, then Z and $2^n$ are coprime. 2 is the unique divisor of $2^n$, and 2 does not divide $2*b+1$.

It is thus possible to choose:

$$D_{Pi}: Z \rightarrow Z: D_{Pi}(X) = 2 * \text{coeff}_{Pi} * X + 1.$$

A more generic solution is: $D_{Pi}: Z \rightarrow Z: D_i(X) = G(X) \ \& \ 0xFFFFFFFC + 0x1$, where G is a function in $Z \rightarrow Z$. F can for example be a polynomial function, a permutation in $\{1 \ldots N\} \rightarrow \{1 \ldots N\}$, or a rotation. It is noted that such a generic function $D_{Pi}$ is not necessary injective. This does not impact the solution of the present disclosure as it does not require unicity of $D_{Pi}$ values.

The diffusion functions can also be set to be almost any kind of function through the use of pointers. In this case, the coefficients are pointers to functions, an example being $D_{Pi}(X) = 2 * (* \text{coeff}_{Pi})(X) + 1$, where $(* \text{coeff}_{Pi})(X)$ indicates, with reference to the diffusion parameter table 47, that the function at address $\text{coeff}_i$ takes X as input. The expression "diffusion parameter" is intended to cover both a value obtained from at least one of the coefficients of the diffusion function and an address of a diffusion function.

In an embodiment, for each $BB_i$, $D_{Pi}(X)=2*coeff_{Pi}*X+1$. This can be implemented by declaring the global array 47 g_DiffusionCoeff[ ] that comprises the coefficients $coeff_i$ for $i \in \{0 \ldots M-1\}$. The embodiment uses an integer live variable P such as $P_i \in \{0, M-1\}$. $P_i$ acts as an index in the global array 47 g_DiffusionCoeff[ ] to retrieve the current coefficient $coeff_{Pi}$. Thus the following function is inlined in basic block $D_{Pi}$: $Z_i = 2*g\_DiffusionCoeff[P_i]*X+1$.

The skilled person will appreciate that FIG. 4 is merely an example and that various modifications may be made. For example, the constants can be defined anywhere within the BB as long as this is done before they are used, there can be a different number of constants used in the formulae, the formulae used to obtain the derived values may be different, the first branch function $B1_i( )$ and the second branch function $B2_i( )$ may be different, and so on.

Figure 5:
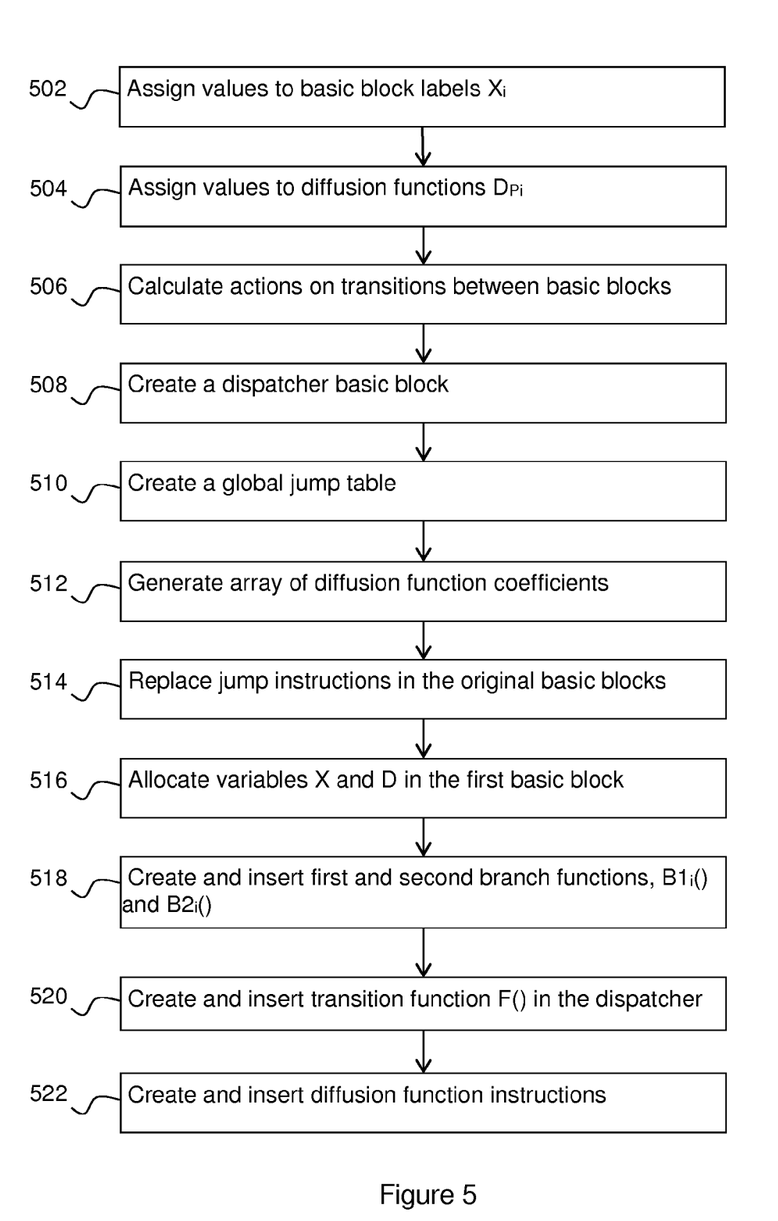
FIG. 5 illustrates a method for CFG flattening according to the present principles.

FIG. 5 illustrates a method for CFG flattening according to the present principles. The method is advantageously performed by a CFG flattening device and takes as input a computer program with N basic blocks, where N is an integer greater than 1. The method can flatten the CFG for all the functions of the computer program or for a subset of these functions. An example for the unflattened CFG comprising basic blocks A-E, illustrated in FIG. 6, will be given for some steps.

In step 502, the label for each basic block is given or assigned a distinct value, preferably in $\{1 \ldots N\}$. This can be done by shuffling the basic blocks using the Fisher-Yates shuffle algorithm or the like.

Figure 6:
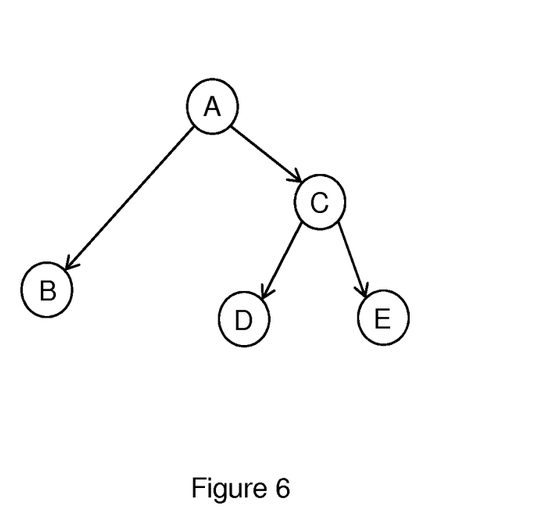
FIG. 6 illustrates an exemplary unflattened CFG.

$BB_A$: $X_A=4$
$BB_B$: $X_B=1$
$BB_C$: $X_C=2$
$BB_D$: $X_D=3$
$BB_E$: $X_E=5$

In step 504, the diffusion function index Pi for each basic block is given or assigned a value in $\{0 \ldots M-1\}$. As there is no uniqueness constraint on $P_i$, it is possible to pick random values.

In the example, the diffusion function indices will be given abstract values P0-P2 (i.e. M=3) that in reality would correspond to integers.

$BB_A$: $P_A=P1$
$BB_B$: $P_B=P2$
$BB_C$: $P_C=P0$
$BB_D$: $P_D=P2$
$BB_E$: $P_E=P1$

In step 506, the actions upon transitions between the basic blocks are calculated, i.e. the changes for the labels X and the diffusion function indices $P_i$. In other words, this corresponds to the modifications made by the first branch function $B1_i( )$ and the second branch function $B2_i( )$ In the example, the calculations for the diffusion function indices is performed modulo 3, since M=3 in the example.

$BB_A \rightarrow BB_B$: $X_B = X_A - 3$, $P_B = P_A + 1 \mod 3$ $BB_A \rightarrow BB_C$: $X_C = X_A - 2$, $P_C = P_A + 2 \mod 3$ $BB_C \rightarrow BB_D$: $X_D = X_C + 1$, $P_D = P_C + 2 \mod 3$ $BB_C \rightarrow BB_E$: $X_E = X_C + 3$, $P_E = P_C + 1 \mod 3$ In step 508, the dispatcher basic block is created. As already mentioned, the dispatcher comprises instructions to look up an address in the jump table and to jump to this address of the dispatcher basic block.

In step 510, the global jump table is created. The global jump table associates, for each basic block, the label X with the address of the basic block $BB_i$.

In step 512, the array 47 of diffusion functions coefficients is generated. The array 47 of diffusion functions coefficients comprises coefficients used by the diffusion functions $D_i( )$ and preferably also dummy values.

In step 514, the jump terminal instruction to another basic block is replaced by a jump to the dispatcher in each basic block of the original CFG.

In step 516, integer variables X and D and allocated in the stack of the target function of the original CFG and they are respectively initialized to $X_0$ and $D_0$. To do this, four intermediate language instructions are added in the first basic block of the function. Two integer allocation instructions are inserted to declare variables X and D into the stack and two affectation instructions are inserted to initialize these variables respectively to $X_0$ and $D_0$.

In step 518, the first branch functions $B1_i( )$ and the second branch functions $B2_i( )$ are created and inserted along with necessary constants into the basic blocks before the jump terminal instructions.

In step 520, the transition function F( ) is created and inserted into the dispatcher.

In step 522, the instructions for the diffusion functions $D_i( )$ are created and inserted along with necessary constants into the basic blocks.

The constants for the branch functions $B1_i( )$ and $B2_i( )$ are inserted with the branch functions. In the example, these constants are $\{a_i, b_i\}$ and $\{c_i, d_i\}$. For each basic block $BB_i$, the CFG flattening device knows the current values of $X_i$ and $Z_i$ as well as the values $X_{i+1}$ and $Z_{i+1}$ of its successors. Determining the coefficients can thus be done by resolving the equations $X_{i+1}=B1_i(Z_i)$, $D_{Pi+1}=B2_i(D_{Pi})$. The resolutions of the equations are trivial as these functions are linear and invertible.

As an example, imagine that basic block $BB_3$ with label $X_i=3$ jumps to $BB_5$: $X_i=5$ for k>2, and to $BB_6$: $X_i=6$ otherwise. The conditional statement can be expressed by a Boolean function $Y_i(k)=1$ if k>2, 0 else. Then it is possible to write:

$$X_{i+1} = B_3(X_i)$$
$$= X_i + Y_i(k) \times (5-3) + (1 - Y_i(k)) \times (6-3)$$
$$= X_i + Y_i(k) \times 2 + (1 - Y_i(k)) \times 3$$
$$= X_i + Y_i(k) \times (-1) + 3$$

which means that the coefficients of branch function $BB_3( )$ are $a_i=-1$, $b_i=3$. The coefficients for $D_i$ can be obtained in the same manner.

The different $X_i$ can be obtained by enumerating the possible solutions and then validating one of them. Since a modulus function is used, there may be more than one solution, but it is certain that there is at least one function that may be found this way.

In the same manner, the CFG flattening device solves $D_{Pi+1}=B2_i(D_{Pi})$ to obtain coefficients $c_i, d_i$. The coefficients $c_i, d_i$ are inserted as local constants inside the basic block $BB_i$ and referenced by the second branch function $B2_i( )$.

The branch functions $B1_i( )$ and $B2_i( )$ can be adapted for a basic block having 1 to K successors. For each successor BB$_j$ of BB$_i$, there is a conditional statement that expresses the condition to branch from BB$_i$ to BB$_j$, given some input. Let Y$_{ij}$( ) denote the Boolean function in BB$_i$, i∈{1 . . . N}, j∈{1 . . . K}:

$$Y_{ij}(\text{input}) = 1 \text{ if (input)} == value_j$$
$$= 0 \text{ else.}$$

Then $X_{i+1}=B1_i(X_i)=X_i+\Sigma_{j=1}^{K}(Y_{ij}(\text{input})*a'_{ij})$.

Figure 7:
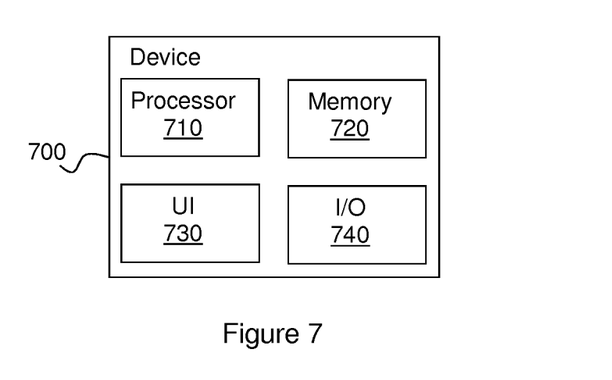
FIG. 7 illustrates an exemplary CFG flattening device.

FIG. 7 illustrates an exemplary CFG flattening device 700 in which the present method is implemented. The device 700 comprises at least one hardware processing unit ("processor") 710, memory 720, a user interface 730 for interacting with a user, and a communications interface 740 for communication with further devices over a connection such as the Internet. The skilled person will appreciate that the illustrated device is very simplified for reasons of clarity and that real devices in addition would comprise features such as power supplies and persistent storage.

The processor 710 is configured to obtain a computer program with an at least partly unflattened CFG, flatten the CFG of the computer program using the present principles (advantageously the method illustrated in FIG. 5), and output a computer program with an at least partly flattened CFG. The flattened computer program is advantageously stored on a non-transitory storage medium (not shown).

It will be appreciated that the flattening of the CFG according to the present principles can be made during compilation at the intermediate language level, but that it can also be made at source or binary level.

Moreover, the present principles can provide a generic and automatic solution that can work for any kind of CFG, whatever it looks like (for instance, with loop circuits, multiple basic block predecessors, multiple basic block successors, etc. . . . ).

Each feature disclosed in the description and (where appropriate) the claims and drawings may be provided independently or in any appropriate combination. Features described as being implemented in hardware may also be implemented in software, and vice versa. Reference numerals appearing in the claims are by way of illustration only and shall have no limiting effect on the scope of the claims.

The invention claimed is:

1. A method for control flow graph flattening of a function of software code, the function comprising a plurality of basic blocks each having an address and at least one instruction, the method, performed by a processor of a device, comprising:

assigning a value to at least one diffusion function coefficient of a diffusion function of each of the plurality of basic blocks;

calculating changes for labels and diffusion functions indices upon transitions between the plurality of basic blocks, the changes corresponding to modifications made by a linear first branch function and a linear second branch function;

creating a dispatcher basic block comprising instructions to look up an address in a jump table and to jump to the address;

creating the jump table associating the label of each basic block with the address of the basic block;

creating a coefficient array comprising diffusion function coefficients;

replacing a jump terminal instruction by a jump to the dispatcher basic block in each of the plurality of basic blocks;

creating and inserting into each of the plurality of basic blocks the first branch function and the second branch function, the first branch function taking as input a result of a diffusion function in the present basic block and outputting the label of the subsequent basic block to execute, the second branch function taking as input a diffusion function index of the present basic block and outputting a diffusion function index of the subsequent basic block based;

creating and inserting a transition function into the dispatcher basic block, the transition function obtaining the address in the jump table based on at least the label of the subsequent basic block; and creating and inserting diffusion functions in the plurality of basic blocks, a diffusion function inserted in the present basic block calculating a value based on at least one diffusion function coefficient dependant on the diffusion function index and the label of the present basic block.

2. The method of claim 1, wherein the transition function obtains the address in the jump table based on also at least one diffusion function coefficient of the subsequent basic block.

3. The method of claim 1, further comprising, before creating and inserting the branch functions, assigning a value to the label of each of the plurality of basic blocks.

4. The method of claim 1, further comprising obtaining coefficients for each of the plurality of basic blocks.

5. A device for control flow graph flattening of a function of software code, the function comprising a plurality of basic blocks each having an address and at least one instruction, the device comprising a hardware processor configured to:

assign a value to at least one diffusion function coefficient of a diffusion function of each of the plurality of basic blocks;

calculate changes for labels and diffusion functions indices upon transitions between the plurality of basic blocks, the changes corresponding to modifications made by a linear first branch function and a linear second branch function;

create a dispatcher basic block comprising instructions to look up an address in a jump table and to jump to the address;

create the jump table associating a label of each basic block with the address of the basic block;

create a coefficient array comprising diffusion function coefficients;

replace a jump terminal instruction by a jump to the dispatcher basic block in each of the plurality of basic blocks;

create and insert into each of the plurality of basic blocks the first branch function and the second branch function, the first branch function taking as input a result of a diffusion function in the present basic block and outputting the label of the subsequent basic block to execute, the second branch function taking as input a diffusion function index of the present basic block and outputting a diffusion function index of the subsequent basic block based;

create and insert a transition function into the dispatcher basic block, the transition function obtaining the address in the jump table based on at least the label of the subsequent basic block; and create and insert diffusion functions in the plurality of basic blocks, a diffusion function inserted in the present basic block calculating a value based on at least one diffusion function coefficient dependant on the diffusion function index and the label of the present basic block; and an interface configured to output the function after control flow graph flattening.

6. The device of claim 5, wherein the processor is further configured to make the transition function obtain the address in the jump table based on also at least one diffusion function coefficient of the subsequent basic block.

7. The device of claim 5, wherein the processor is further configured to assign a value to the label of each of the plurality of basic blocks, before creating and inserting the branch functions.

8. The device of claim 5, wherein the processor is further configured to obtain coefficients for each of the plurality of basic blocks.

* * * * *